July 1, 1930.  F. E. STONE  1,769,193
AUTOMATIC GEAR SHIFT
Filed Aug. 8, 1928  3 Sheets-Sheet 2
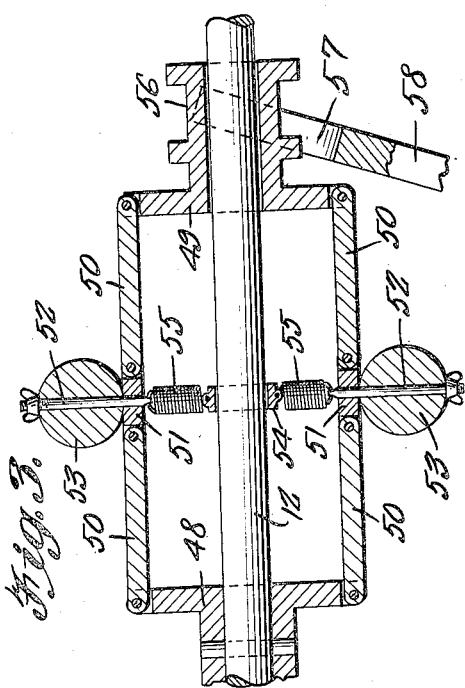
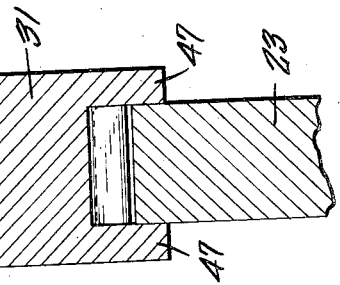
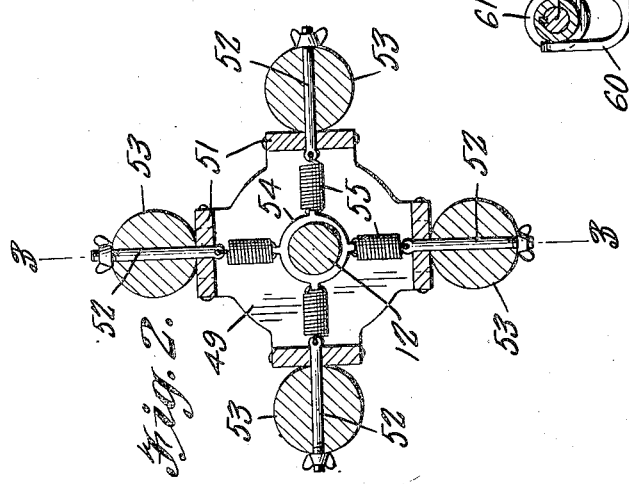
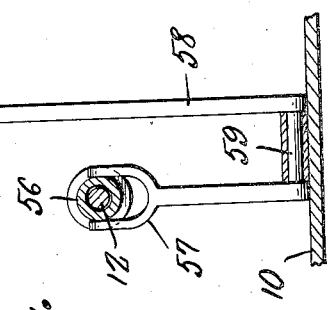
Fred E. Stone, INVENTOR
BY Victor J. Evans ATTORNEY July 1, 1930.   F. E. STONE   1,769,193
AUTOMATIC GEAR SHIFT
Filed Aug. 8, 1928   3 Sheets-Sheet 3
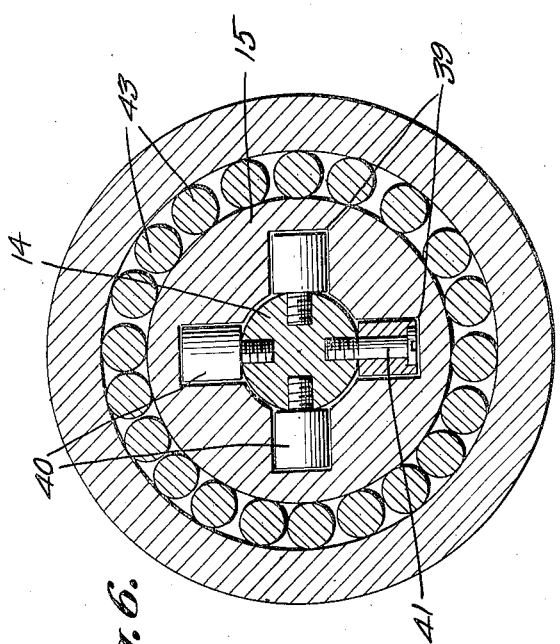
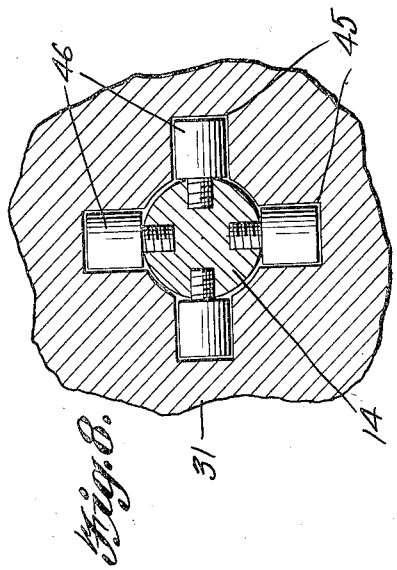
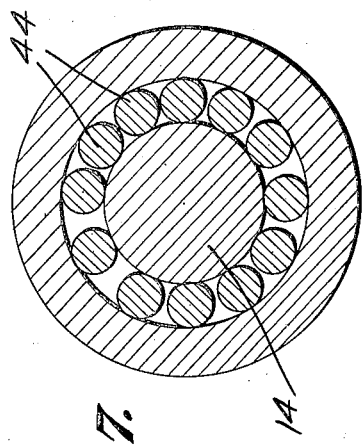
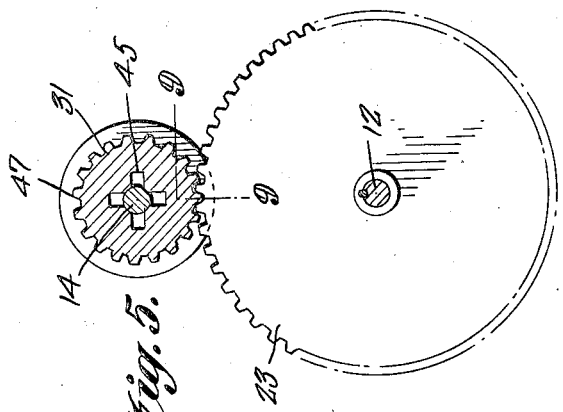
Fred E. Stone,
INVENTOR
BY Victor J. Evans
ATTORNEY
WITNESS:

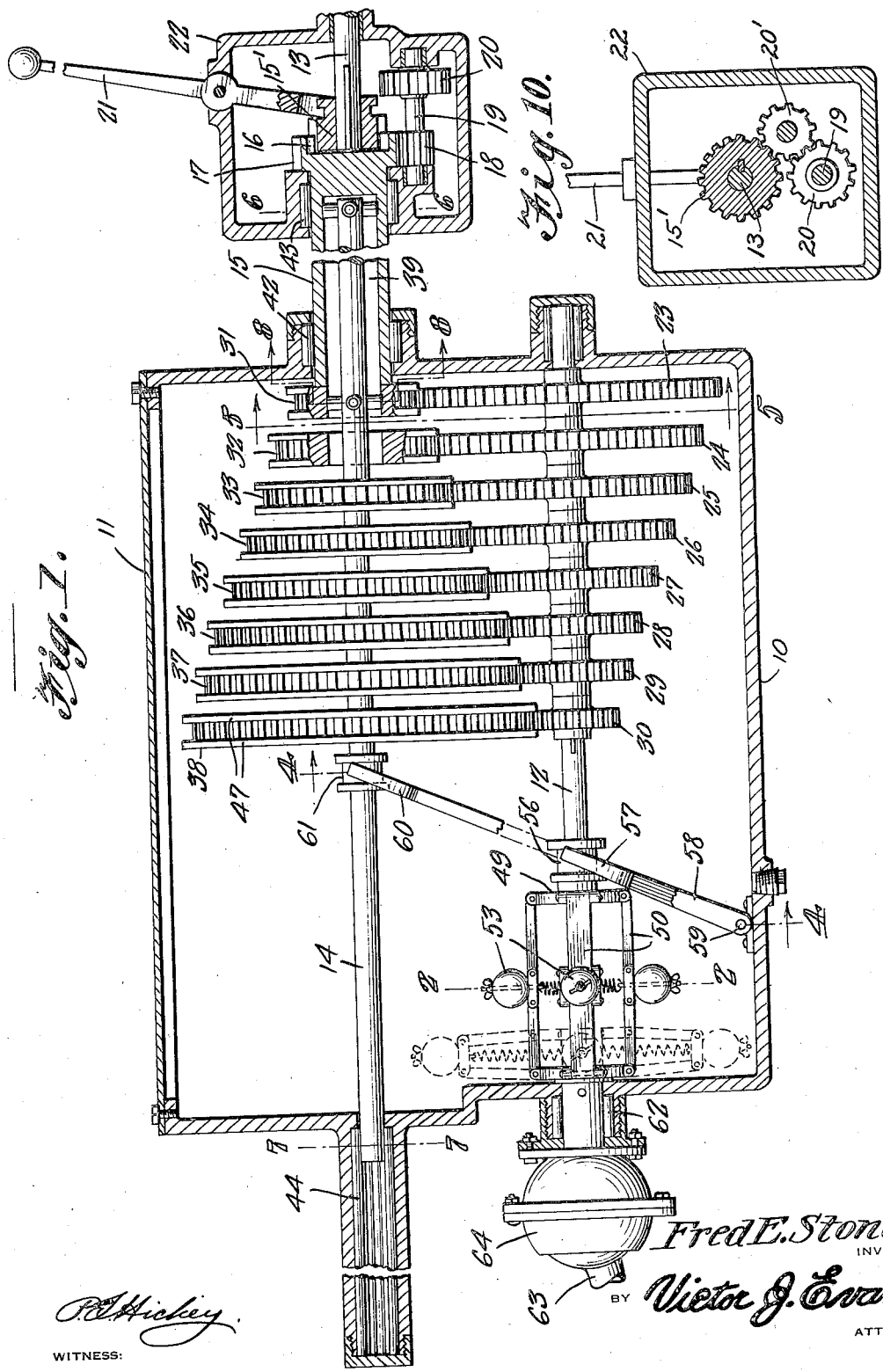

Patented July 1, 1930

1,769,193

UNITED STATES PATENT OFFICE

FRED E. STONE, OF LIMERICK, MAINE

AUTOMATIC GEAR SHIFT

Application filed August 8, 1928. Serial No. 298,274.

This invention relates to variable speed power transmission mechanism, an object being to provide means for automatically controlling the speed ratio of the drive and driven shafts of such a mechanism by the load upon the driven shaft, the invention being especially adapted for use in automobiles.

Another object of the invention is the provision of a variable speed transmission mechanism for automobiles in which the speed ratio of the engine and vehicle is automatically governed by the load of the latter, together with manually operated means to selectively control the direction of rotation of the driven shaft of said mechanism to control the forward or reverse movement of the automobile.

Another object of the invention is the provision of a mechanism of the above character in which the variable speed gears are always in mesh, the direction of rotation of the gears being controlled by shiftable forward and reverse gears.

Another object of the invention is the provision of a transmission mechanism which in addition to the above and other advantageous features, is simple in construction and operation, and will prevent excessive strains upon an engine due to overloads and racing when the engine is in gear, the speed of operation of the engine being controlled by the vehicle load, so that a reduction in fuel consumption will result.

With the above and other objects in view, the invention further includes the following novel features and details of construction, to be hereinafter more fully described, illustrated in the accompanying drawings and pointed out in the appended claim.

In the drawings:—

Figure 1 is a longitudinal sectional view through a transmission mechanism constructed in accordance with the invention.

Figure 2 is an enlarged detail section taken on the line 2—2 of Figure 1.

Figure 3 is a detail section taken on the line 3—3 of Figure 2 and showing a fragmentary portion of the governor controlled lever.

Figure 4 is a fragmentary section taken substantially on the line 4—4 of Figure 1.

Figures 5, 6, 7 and 8 are enlarged detail sections taken respectively on the line 5—5, 6—6, 7—7, and 8—8 of Figure 1.

Figure 9 is an enlarged framentary section taken on the line 9—9 of Figure 5.

Figure 10 is a detail view illustrating the reverse gearing.

Referring to the drawings in detail wherein like characters of reference denote corresponding parts, the reference character 10 indicates a housing within which is positioned the variable speed gears to be later described. This housing is open at the top and is provided with a removable cover plate 11, by means of which access may be had to the interior.

The invention includes a driven shaft 12 and a drive shaft which is composed of a power section 13, a longitudinally slidable section 14 and an intermediate section 15, the latter serving to couple the sections 13 and 14.

The section 13 may represent the crank shaft of an engine and has slidingly mounted thereon a gear 15.' This gear is adapted to engage an internal gear 16 provided at one end of the intermediate section 15 and when so engaged will drive the intermediate section in one direction (forward) at the same speed of rotation as the speed of the section 13. The intermediate section 15 is also provided with an external gear 17 which engages a pinion 18 fast upon a countershaft 19 and also fast upon this countershaft is a gear 20. The gear 20 is adapted to be driven from the gear 15', the latter being slidable upon the shaft 13 through the medium of a gear shift lever 21. When the gears 15 and 20 are engaged, the intermediate section 15 of the drive shaft will be rotated in a reverse direction, the speed of rotation also being the same as the speed of rotation of the power section 13. The forward and reverse speed gears just described are contained within a housing 22, Fast upon the shaft 12 are gears 23, 24, 25, 26, 27, 28, 29 and 30, which successively decrease in diameter. These gears mesh respectively with gears 31, 32, 33, 34, 35, 36, 37 and 38 which are freely rotatable upon the shaft section 14.

The drive shaft section 14 is slidable with respect to the section 15 and for this purpose, the drive shaft section 15 is provided with longitudinally extending radially disposed grooves 39, as shown in Figures 1 and 6 of the drawings. The shaft section 14 carries radially extending rollers or studs 40 which operate in the grooves 39 and which are preferably secured to the shaft section 14 by means of screws 41. By this means, rotation of the shaft section 15 will rotate the shaft section 14 while the latter is longitudinally slidable within the former. The shaft section 15 is mounted for rotation in an anti-friction bearing 42 at one end of the housing 10 and an anti-friction bearing 43 at the adjacent end of the housing 22, while the opposite end of the shaft section 14 is slidingly mounted in a roller bearing 44 which extends from the housing 10.

The gears 31, 32, 33, etc. are each provided with radially disposed slots 45 which extend transversely therethrough and the shaft section 14 carries radially disposed rollers or studs 46, similar to the rollers or studs 40. The studs or rollers 46 enter the grooves 45 of the gears just mentioned and serve to lock a particular gear to the shaft section. Movement of the gears 31, 32, 33, etc. longitudinally of the shaft is prevented by means of flanges 47 which extend around the gears and engage upon opposite sides of the gears 23, 24, 25, etc. so that the gears of the driven shaft and the gears of the drive shaft are always in mesh.

Mounted upon the shaft 12 is a centrifugal governor which includes a collar 48 which is fast to the shaft and a collar 49 which is slidable thereon. The collars 48 and 49 have pivotally secured thereto arms 50 and the adjacent ends of these arms are pivotally connected to blocks 51 through which extend rods 52. The outer ends of these rods have mounted thereon balls or weights 53 and their inner ends are connected to a collar 54 which surrounds the shaft 12, by means of springs 55. These springs thus yieldingly resist outward movement of the balls 43. The collar 49 is provided with a peripheral groove 56 which is engaged by a fork 57 provided in a lever 58. This lever is pivotally mounted as shown at 59 and its upper end is provided with a fork 60 which engages a grooved collar 61 fast upon the section 14 of the drive shaft.

The driven shaft 12 is mounted in anti-friction bearings 62 and when the mechanism is used in an automobile, the driven shaft may be connected to the torque shaft 63 of the automobile through the medium of a universal joint 64.

When the gears are in neutral, the gear 15 through the operation of the lever 21, will be disengaged from both the gear 16 and the gear 20. In this position, the section 14 of the driven shaft will be idle and the studs 46 of the drive shaft section 14 will be positioned within the slots of the gear 31. When the engine is operating and the gear 15 is engaged with either the gear 16 or the gear 20 (according to whether the driver wishes to go forward or backward) the gear 31 will be locked to the shaft section 14 and the shaft 12 will be driven through the gear 23, the gears 23 and 31 being the low speed gears.

As the speed of the engine increases, speed of rotation of the shaft 12 will likewise increase so that the balls 53 of the governor will move centrifugally outward, whereupon the lever 58 will be operated to slide the shaft section 14 rearward. The studs 46 will then move from the gear 31 to the gear 32, whereupon the rate at which the shaft 12 is driven will be increased through the ratio of the gears 32 and 24. Continued rearward movement of the shaft 41 will correspondingly increase the speed of rotation of the shaft 12.

The diameter of the studs 46 and the distance between the gears 31, 32, 33, etc. are such that as the studs leave one gear they engage the adjacent gear, there being no neutral position between these gears. Should the slots of the gears be so arranged that the studs do not at once enter an adjacent gear, they will still engage the leaving gear so that the shaft 12 will continue to be driven.

As the load upon the driven shaft 12 increases, due to ascending a grade, or from other causes, the speed of the vehicle to which the invention is attached will be lessened, so that the speed of rotation of the shaft 12 will be correspondingly decreased. As the speed is decreased, the lever 58 will move forward or toward the gears 31, 32, etc., the degree of movement being governed by the speed of the shaft 12. When the automobile is stopped, the shaft 12 will be automatically moved so as to lock the low speed gear 31 thereto, so that when the automobile is started, it will be started in low gear and the gear ratio will be changed as the engine is speeded up.

The invention is susceptible of various changes in its form, proportions and minor details of construction and the right is herein reserved to make such changes as properly fall within the scope of the appended claim.

Having described the invention what is claimed is:

In a power transmission mechanism, a longitudinally movable drive shaft, a driven shaft, spaced spur gears of decreasingly different diameters fast upon the driven shaft, spaced spur gears of increasingly different diameters free upon the drive shaft and engaging the gears of the driven shaft, means controlled by the position of the drive shaft to lock any one of the gears to said shaft, a pivotally mounted lever, means operatively connecting the lever with the drive shaft to move the latter longitudinally when the lever is moved pivotally, and means governed by the load upon the driven shaft and operatively connected with said lever to move the latter and control the gear locking means.

In testimony whereof I affix my signature.

FRED E. STONE.